(12) United States Patent
Kim et al.

(10) Patent No.: US 12,711,581 B2
(45) Date of Patent: Aug. 18, 2026

(54) MULTI-VIEW VIDEO CODING ARTIFACT REDUCTION METHOD AND SYSTEM

(71) Applicant: Korea Electronics Technology Institute, Seongnam-si (KR)

(72) Inventors: Yong Hwan Kim, Anyang-si (KR); Je Won Kang, Seoul (KR); Hyun Ho Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 260 days.

(21) Appl. No.: 18/545,093

(22) Filed: Dec. 19, 2023

(65) Prior Publication Data

US 2025/0106432 A1 Mar. 27, 2025

(30) Foreign Application Priority Data

Sep. 27, 2023 (KR) ........................ 10-2023-0129911

(51) Int. Cl.
*G06T 5/50* (2006.01)
*G06T 3/18* (2024.01)
*G06V 10/44* (2022.01)

(52) U.S. Cl.
CPC .................. *G06T 5/50* (2013.01); *G06T 3/18* (2024.01); *G06V 10/44* (2022.01); *G06T 2207/20221* (2013.01)

(58) Field of Classification Search
None
See application file for complete search history.

(56) References Cited

U.S. PATENT DOCUMENTS

2018/0070105 A1* 3/2018 Jin ........................ H04N 19/521

FOREIGN PATENT DOCUMENTS

KR 10-2014-0043030 A 4/2014
KR 10-2023-0041601 A 3/2023

OTHER PUBLICATIONS

Jeon, G., Lee, Y., Lee, J. K., Kim, Y. H., & Kang, J. W. (Nov. 2023). Robust spatial-temporal motion coherent priors for multi-view video coding artifact reduction. IEEE Access, 11, 123104-123116. (Year: 2023).*

Jeon, G. L., Kim, H. J., Yeo, E., & Kang, J. W. (Jul. 2022). CNN based multi-view image quality enhancement. In 2022 Thirteenth International Conference on Ubiquitous and Future Networks (ICUFN) (pp. 372-375). IEEE. (Year: 2022).*

(Continued)

*Primary Examiner* — Ian L Lemieux
(74) *Attorney, Agent, or Firm* — NSIP Law

(57) ABSTRACT

There is provided a multi-view video coding artifact reduction method and system. According to an embodiment, the multi-view video coding artifact reduction method selects reference fames in neighbors of a current frame constituting a multi-view video, derives unidirectional flows and bilateral flows between the current frame and the reference frames, warps the reference frames based on the derived flows, generates intermediate frames by fusing the current frame, the reference frames, and the warped reference frames, and generates a final frame by fusing the current frame and the intermediate frames. Accordingly, image quality of the multi-view video can be more enhanced.

20 Claims, 9 Drawing Sheets

(56) References Cited

OTHER PUBLICATIONS

Micallef, B. W., Debono, C. J., & Farrugia, R. A. (2014). Reducing 3D video coding complexity through more efficient disparity estimation. IEEE Transactions on Consumer Electronics, 60(1), 74-82. (Year: 2014).*
Zhou, S., Hu, Y. H., & Jiang, H. (2019). Multi-view image denoising using convolutional neural network. Sensors, 19(11), 2597. (Year: 2019).*
Choi, B. D., Han, J. W., Kim, C. S., & Ko, S. J. (2007). Motion-compensated frame interpolation using bilateral motion estimation and adaptive overlapped block motion compensation. IEEE Transactions on Circuits and Systems for Video Technology, 17(4), 407-416. (Year: 2007).*
Wu, C., He, G., Lai, X., & Li, Y. (Sep. 2023). MPCNet: Compressed multi-view video restoration via motion-parallax complementation network. Neural Networks, 167, 601-614. (Year: 2023).*
Sun, D., Yang, X., Liu, M. Y., & Kautz, J. (2018). Pwc-net: Cnns for optical flow using pyramid, warping, and cost volume. In Proceedings of the IEEE conference on computer vision and pattern recognition (pp. 8934-8943). (Year: 2018).*
Korean Office Action Issued on Feb. 23, 2026, in Counterpart Korean Patent Application No. 10-2023-0129911 (6 Pages in English, 8 Pages in Korean).

* cited by examiner

MULTI-VIEW VIDEO CODING ARTIFACT REDUCTION METHOD AND SYSTEM

CLAIM OF PRIORITY

This application is based on and claims priority under 35 U.S.C. § 119 to Korean Patent Application No. 10-2023-0129911, filed on Sep. 27, 2023, in the Korean Intellectual Property Office, the disclosure of which is herein incorporated by reference in its entirety.

BACKGROUND

Field

The disclosure relates to multi-view video coding artifact reduction, and more particularly, to a method for reducing a coding artifact of a video which is reconstructed after being compressed in order to overcome a problem that an artifact occurring when a multi-view video is compressed degrades rendering quality of a 3D space when view reconstruction is performed.

Description of Related Art

1. Multi-View Video Coding

Multi-View High Efficiency Video Coding (MV-HEVC), which is an extended multi-view video technology of HEVC, was standardized by ISO/JEC MEPG in 2014 as a 3D video coding technology, and 3D-HEVC which supports a new coding function on a depth image was standardized in 2015.

Recently, MEPG Immerse Video (MPEG-I MIV) standard version 1 which uses a new approach for super multi-view 3D video coding (a method of compressing only a video at a partial viewpoint and a differential video between a main viewpoint and an auxiliary viewpoint), different from existing methods, was released in 2021, and version 2 for additional coding rate enhancement is being standardized.

To compress a multi-view video, association between times and viewpoints is actively utilized. A decoder may not only decode a video of a main viewpoint that is transmitted from an encoder but also reconstruct a video of an auxiliary viewpoint from the video of the main viewpoint. Also, a decoder may reconstruct a video of an intermediate viewpoint through a synthesis technology by using already received information when necessary.

However, related-art 3D video coding technologies may have a problem that image quality of videos at an auxiliary viewpoint and an intermediate viewpoint, except for a video at a main viewpoint, is degraded due to a problem in quantization parameters and synthesis technology.

FIG. 1 illustrates transmission information at a main viewpoint ($V_0$) and an auxiliary viewpoint ($V_1$) of a test model for MEPG immersive video (TMIV) which is reference software of MPEG-1 MIV standards. As shown in FIG. 1, transmission information at the auxiliary viewpoint ($V_1$) contains many high frequency components which are vulnerable to an artifact in a process of removing redundancy information between viewpoints.

FIG. 2 illustrates a hierarchical B structure which is utilized in MV-HEVC. As shown in FIG. 2, a video at an auxiliary viewpoint ($V_1$) may suffer lossy coding due to a larger number of quantization parameters than at a main viewpoint ($V_0$, $V_2$), and image quality degradation at the auxiliary viewpoint becomes more serious than at the main viewpoint.

2. Related-Art Multi-View Video Coding Artifact Reduction Neural Network Technology Reference frame-based coding artifact reduction neural network technology: The reference frame-based coding artifact reduction neural network technology refers to a technology that is used to reduce a coding artifact by selecting, as a reference frame, a frame of high image quality among frames positioned in neighbors of a current frame which is a target for reducing a coding artifact, and extracting useful features. This technology may use a learning-based selection module which selects a reference frame of high image quality, or may use a 3D video coding structure which reduces a coding artifact by selecting a reference frame at a neighboring viewpoint and mering with features of a current frame. The reference frame-based coding artifact reduction technology provides more excellent performance than related-art other technologies for reducing a coding artifact by using only a current frame as an input without reference information.

A related-art reference frame-based image quality enhancement technology uses an optical flow in a feature information domain as a means for finding feature information of high quality in a reference frame. As a representative example, a super resolution technology usefully uses optical flow information in a process of increasing a low resolution to a high resolution. Existing researches use a process of finding reference information by using an optical flow and performing warping for a current frame region, and fusing warping information. FIG. 3 illustrates such a warping process (w: warping vector). FIG. 4 illustrates detailed steps of the reference frame-based coding artifact reduction neural network technology.

However, there is a problem that the optical flow technology is relatively less effective when a video contains a coding artifact. This problem arises from the demerit that the optical flow is vulnerable to a coding artifact and does not guarantee accuracy in searching feature information. In particular, a unidirectional flow shown in FIG. 3 may be more vulnerable on such a problem.

SUMMARY

The disclosure has been developed in order to solve the above-described problems, and an object of the disclosure is to provide a method and a system for reducing a coding artifact, which derive a bilateral flow and a refined flow in addition to a unidirectional flow between viewpoints and times, and refer to the flows in enhancing image quality of a current frame of a multi-view video.

According to an embodiment of the disclosure to achieve the above-described object, a multi-view video coding artifact reduction method may include: a step of selecting reference fames in neighbors of a current frame constituting a multi-view video; a step of deriving unidirectional flows and bilateral flows between the current frame and the reference frames; a step of warping the reference frames based on the derived flows; a step of generating intermediate frames by fusing the current frame, the reference frames, and the warped reference frames; and generating a final frame by fusing the current frame and the intermediate frames.

The step of deriving may include: a step of extracting a current feature vector and reference feature vectors from the current frame and the reference frames; a step of predicting unidirectional warping vectors from the extracted reference feature vectors through unidirectional motion estimation;

and a step of predicting bilateral warping vectors from the extracted reference feature vectors through bilateral motion estimation.

The step of deriving may include further deriving a refinement flow from the unidirectional flow and the bilateral flow. The step of deriving may further include a step of calculating refinement warping vectors by using the predicted bilateral warping vectors and unidirectional warping vectors. The step of calculating may include calculating unidirectional warping vectors of intermediate frames which are generated by the bilateral warping vectors as refinement warping vectors.

The step of generating the intermediate frames may include: a step of generating candidate reference feature vectors by applying corresponding warping vectors to the reference feature vectors; and a step of generating the intermediate frames by fusing the current feature vector with the reference feature vectors and the candidate reference feature vectors.

The reference frames may include: first reference frames which are positioned in temporal neighbors with reference to the current frame; second reference frames which are positioned in spatial neighbors in an x-axis direction with reference to the current frame; and third reference frames which are positioned in spatial neighbors in a y-axis direction with reference to the current frame.

The step of generating the intermediate frames may include: generating first intermediate frames by fusing the current frame, the first reference frames, and warped first reference frames; generating second intermediate frames by fusing the current frame, the second reference frames and warped second reference frames; and generating third intermediate frames by fusing the current frame, the third reference frames and warped third reference frames.

The step of generating the final frame may include generating the final frame by fusing the current frame with the first intermediate frame, the second intermediate frame, and the third intermediate frame.

According to another aspect of the disclosure, there is provided a multi-view video coding artifact reduction system including: a processor configured to: select reference fames in neighbors of a current frame constituting a multi-view video; derive unidirectional flows and bilateral flows between the current frame and the reference frames; warp the reference frames based on the derived flows; generate intermediate frames by fusing the current frame, the reference frames, and the warped reference frames; and generate a final frame by fusing the current frame and the intermediate frames; and a storage unit configured to provide a storage space necessary for the process.

According to still another aspect of the disclosure, there is provided a multi-view video coding artifact reduction method including: a step of deriving unidirectional flows and bilateral flows between a current frame and reference frames which are positioned in neighbors of the current frame; a step of generating intermediate frames based on the derived flows; and generating a final frame by fusing the current frame and the intermediate frames.

As described above, according to embodiments of the disclosure, a coding artifact is reduced by deriving bilateral flows and refined flows in addition to unidirectional flows between viewpoints and times, so that image quality of a multi-view video can be enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a method and a system for reducing a coding artifact of a multi-view video. In order to overcome the problem that an artifact occurring when a multi-view video is compressed degrades rendering quality of a 3D space when view reconstruction is performed, the disclosure provides a technology for reducing a coding artifact of a current video frame which is reconstructed after being compressed, by using a neural network model.

To accomplish this, an embodiment of the disclosure provides stable performance by additionally using a bilateral vector and a refinement vector, instead of using only an existing unidirectional vector, in acquiring texture information of high quality from a reference frame that has few coding artifacts among frames positioned in neighbors of a current video frame on a time and a viewpoint.

That is, in an embodiment of the disclosure, high-quality reconstruction may be performed by selecting a reference frame between viewpoints and times in a multi-view video coding environment, and generating reference information that is robust to a coding artifact from the selected reference frame by using a bilateral flow and a refinement flow in addition to a unidirectional flow. The refinement flow is a flow that is modified (refined) with reference to regional information on the bilateral flow, and contributes to enhancement of reconstruction performance.

Figure 1:
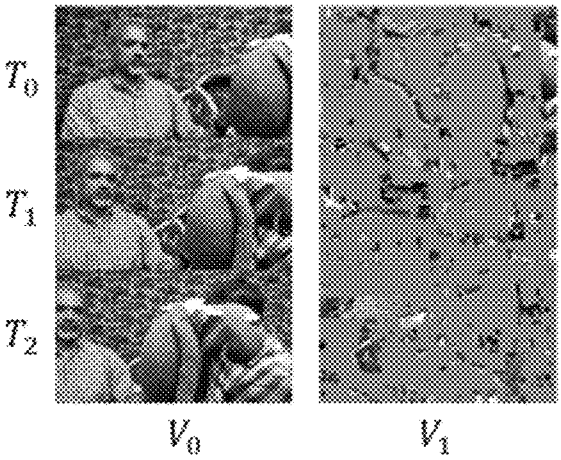
FIG. 1 is a view illustrating transmission information at a main viewpoint and an auxiliary viewpoint of a TMIV.
Figure 2:
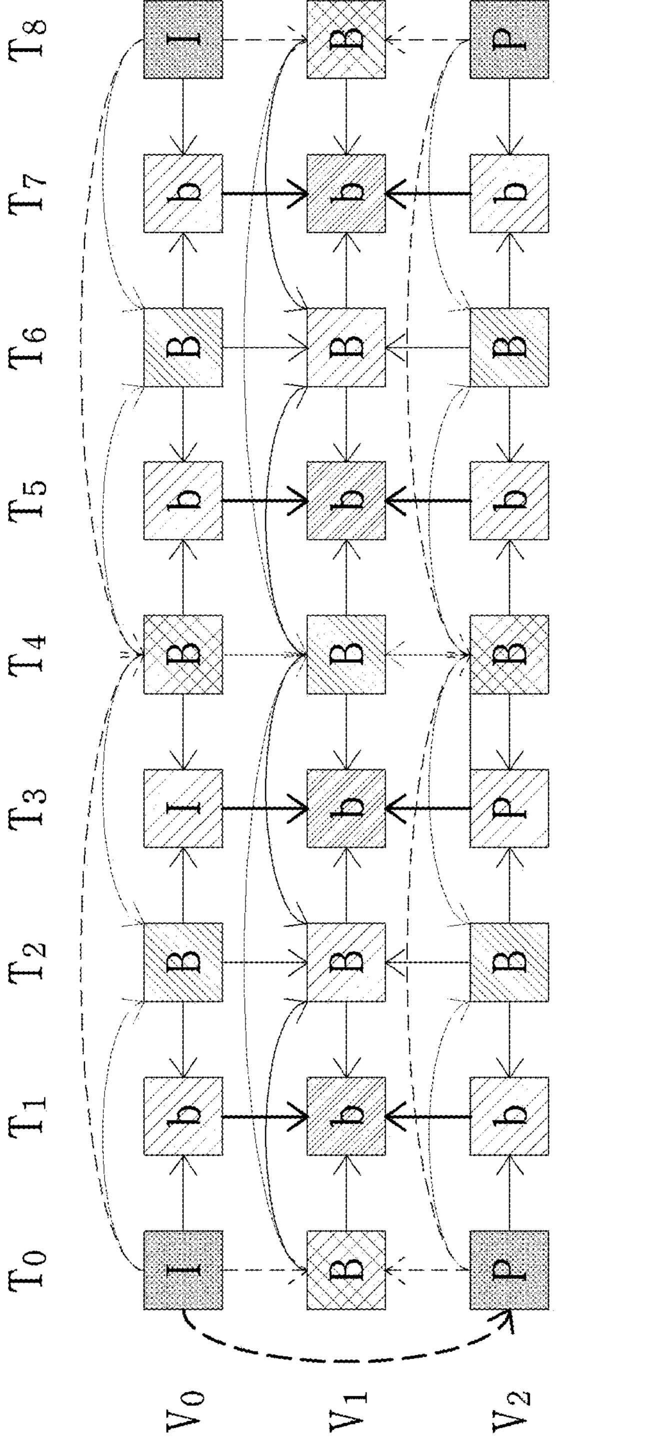
FIG. 2 is a view illustrating a hierarchical B prediction structure which is used in MV-HEVC coding standards.
Figure 3:
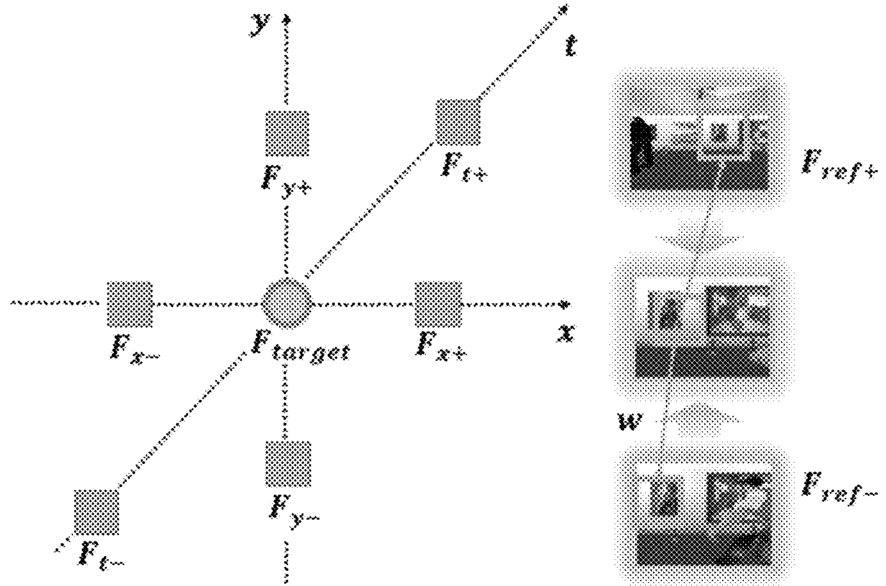
FIG. 3 is a view illustrating a method of reducing a coding artifact of a current frame ($F_{target}$) by applying an existing unidirectional flow in a time or viewpoint direction.
Figure 4:
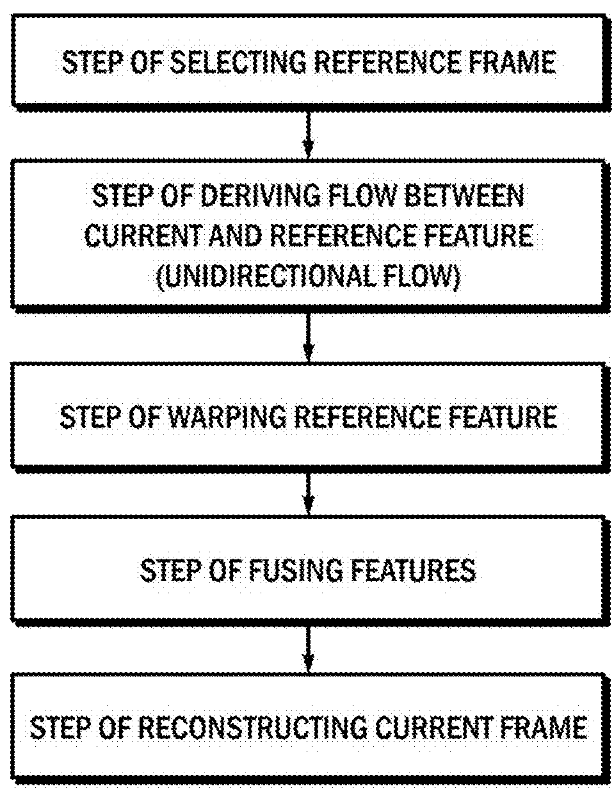
FIG. 4 is a view illustrating detailed steps of a reference frame-based coding artifact reduction neural network technology.
Figure 5:
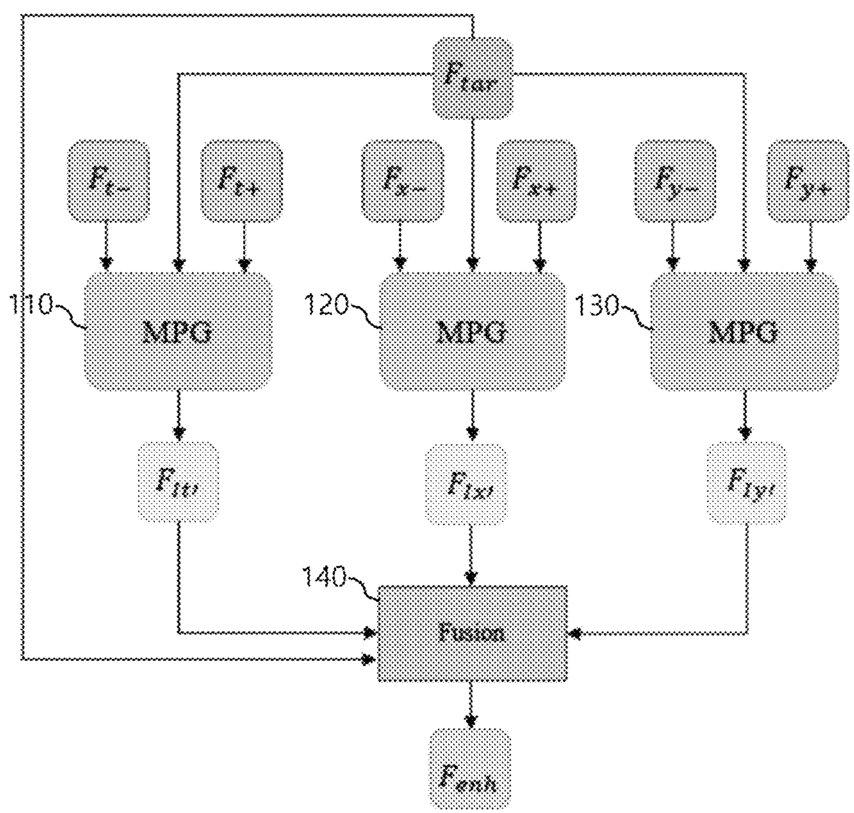
FIG. 5 is a view illustrating a multi-view video coding artifact reduction method according to an embodiment of the disclosure.

FIG. 5 is a view illustrating a multi-view video coding artifact reduction method according to an embodiment of the disclosure. The method illustrated in FIG. 5 is a process of enhancing image quality of a current frame by selecting reference frames between times and viewpoints with reference to the current frame, individually inputting the reference frames, estimating a motion with the current frame, and then fusing.

In FIG. 5, MPG modules 110, 120, 130 perform a function of extracting useful information for enhancing image quality from each reference frame and fusing. The MPG modules 110, 120, 130 will be described in detail hereinbelow.

The MPG module-1 110 generates an intermediate frame $F_{It'}$, through prediction using both a unidirectional flow and a bilateral flow by using two frames $F_{t+}$, $F_{t-}$ positioned in temporal neighbors with reference to a current frame $F_{tar}$. Herein, $F_{t-}$ is a frame that precedes the current frame $F_{tar}$ in chronological sequence, and $F_{t+}$ is a frame that follows the current frame $F_{tar}$ in chronological sequence.

The MPG module-2 120 generates an intermediate frame $F_{Ix'}$, through prediction using both a unidirectional flow and a bilateral flow by using two frames $F_{x+}$, $F_{x-}$ positioned in spatial neighbors in an x-axis direction with reference to the current frame $F_{tar}$. Herein, $F_{x-}$ is a frame that precedes the current frame $F_{tart}$ in terms of viewpoints in the x-axis direction, and $F_{x+}$ is a frame that follows the current frame $F_{tar}$t in terms of viewpoints in the x-axis direction.

The MPG module-3 130 generates an intermediate frame $F_{Iy'}$ through prediction using both a unidirectional flow and a bilateral flow by using two frames $F_{y+}$, $F_{y-}$ positioned in spatial neighbors in a y-axis direction with reference to the current frame $F_{tar}$. Herein, $F_{y-}$ is a frame that precedes the current frame $F_{tar}$ in terms of viewpoints in the y-axis direction, and $F_{y+}$ is a frame that follows the current frame $F_{tar}$ in terms of viewpoints in the y-axis direction.

A fusion module 140 generates a final frame $F_{enh}$ with enhanced image quality by fusing the three intermediate frames $F_{It'}$, $F_{Ix'}$, $F_{Iy'}$ generated by the MPG modules 110, 120, 130. Since texture information of high quality is acquired from a reference frame which has few coding artifacts among frames positioned in neighbors of a current frame, the final frame $F_{enh}$ has more enhanced image quality than the current frame $F_{tar}$.

Figure 6:
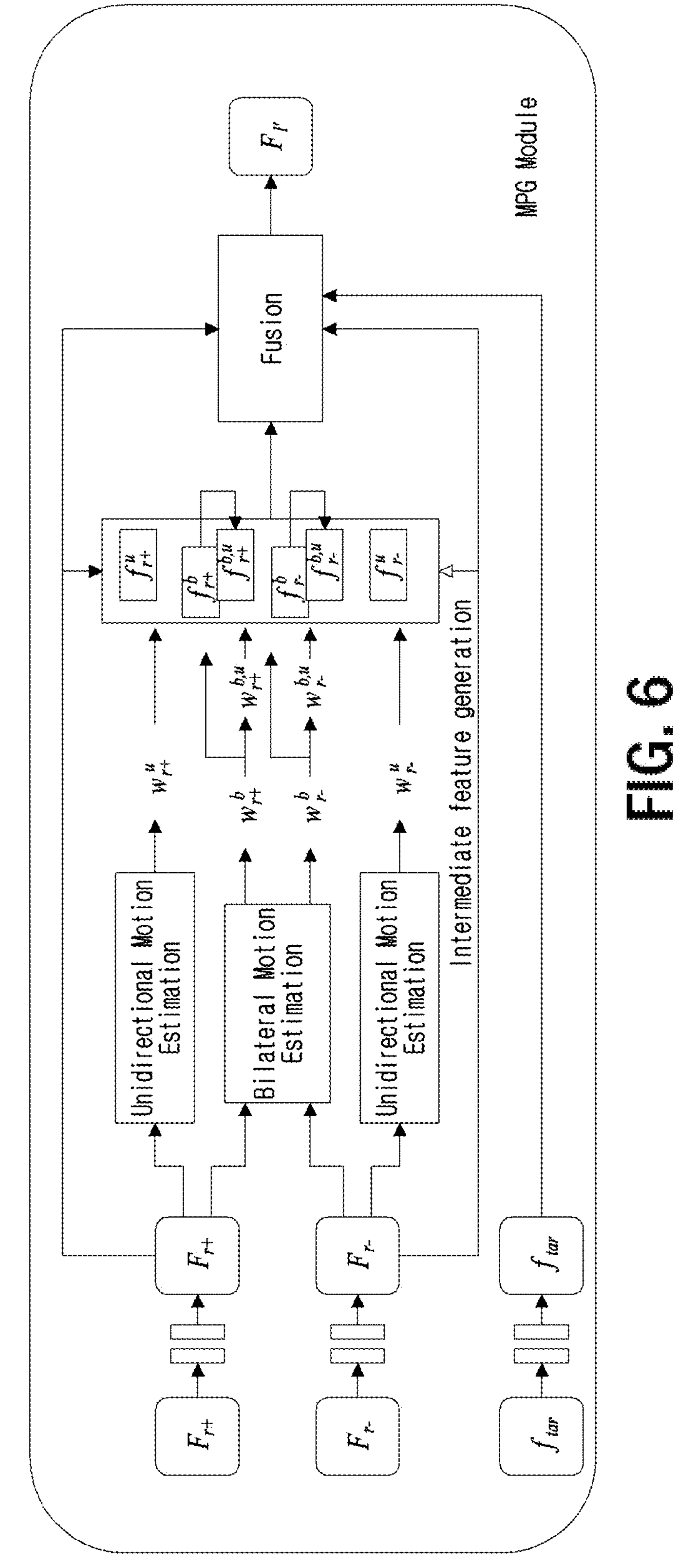
FIG. 6 is a view illustrating detailed functions of a multi-view prior generation (MPG) module.

Detailed functions of the MPG modules 110, 120, 130 will be described hereinbelow with reference to FIG. 6. The MPG modules 110, 120, 130 may be implemented by the same components and thus only one of the MPG modules is illustrated in FIG. 6, and the following signs are used:

Reference frame: $F_{r+}=\{F_{x+}, F_{y+}, F_{t+}\}$, $F_{r-}=\{F_{x-}, F_{y-}, F_{t-}\}$ Reference feature vector: $f_{r+}=\{f_{x+}, f_{y+}, f_{t+}\}$, $f_{r-}=\{f_{x-}, f_{y-}, f_{t-}\}$ Unidirectional warping vector: $w_{r+}^{u}=\{w_{x+}^{u}, w_{y+}^{u}, w_{t+}^{u}\}$, $w_{r-}^{u}=\{w_{x-}^{u}, w_{y-}^{u}, w_{t-}^{u}\}$ Bilateral warping vector: $w_{r+}^{b}=\{w_{x+}^{b}, w_{y+}^{b}, w_{t+}^{b}\}$, $w_{r-}^{b}=\{w_{x-}^{b}, w_{y-}^{b}, w_{t-}^{b}\}$ Refinement warping vector: $w_{r+}^{b,u}=\{w_{x+}^{b,u}, w_{y+}^{b,u}, w_{t+}^{b,u}\}$, $w_{r-}^{b,u}=\{w_{x-}^{b,u}, w_{y-}^{b,u}, w_{t-}^{b,u}\}$ Intermediate frame: $F_{I'}=\{F_{It'}, F_{Ix'}, F_{Iy'}\}$ FIG. 6 illustrates the following processes of deriving flows between a current frame and reference frames by an MPG module, generating candidate intermediate frames by performing warping using the derived flows, and fusing the generated candidate intermediate frames.

1) First, feature vectors $f_{tar}$, $f_{r+}$, $f_{r-}$ are extracted from the current frame and x, y, t direction reference frames $F_{tar}$, $F_{r+}$, $F_{r-}$ by using a neural network model.

2) Warping vectors are acquired as a result of two unidirectional motion estimations which are distinguished as a forward estimation and a backward estimation, respectively, and bilateral motion estimation in a feature vector space. The warping vectors are as follows:

$w_r^{u}$: Unidirectional warping vector; forward and backward warping vectors $w_{r+}^{u}$, $w_{r-}^{u}$ are predicted through a PWC-Net which is a neural network.

$w_r^{b}$: Bilateral warping vector, calculated by the following equation (1):

$$w_S^* = \underset{w_S \in S}{\arg\min} \left| f_{r+}\left(z + \frac{w_S}{2}\right) - f_{r-}\left(z - \frac{w_S}{2}\right) \right|_2^2 \quad \text{Equation (1)}$$

In Equation (1) presented above, S is a search range. A vector that minimizes Equation (1) is a bilateral warping vector. That is, $w_{r+}^{b}=(w_s^*/2)$, $w_{r-}^{b}=(-w_s^*/2)$.

$w_r^{b,u}$: Refinement warping vector

When unidirectional warping vectors are calculated by using intermediate frames $(f_{r+}^{b}, f_{r-}^{b})$ generated by bilateral warping vectors as an input, the calculated vectors are refinement warping vectors $(w_{r+}^{b,u}, w_{r-}^{b,u})$, and may be expressed by the following equations (2) and (3):

$$w_{r+}^{b,u*} = \arg \min_{w_{r+}^{b,u} \in S} \left| f_{r+}(z) - f_{r+}^{b}\left(z + w_{r+}^{b,u}\right) \right|_2^2 \quad \text{Equation (2)}$$

$$w_{r-}^{b,u*} = \arg \min_{w_{r-}^{b,u} \in S} \left| f_{r-}(z) - f_{r-}^{b}\left(z + w_{r-}^{b,u}\right) \right|_2^2 \quad \text{Equation (3)}$$

Figure 7:
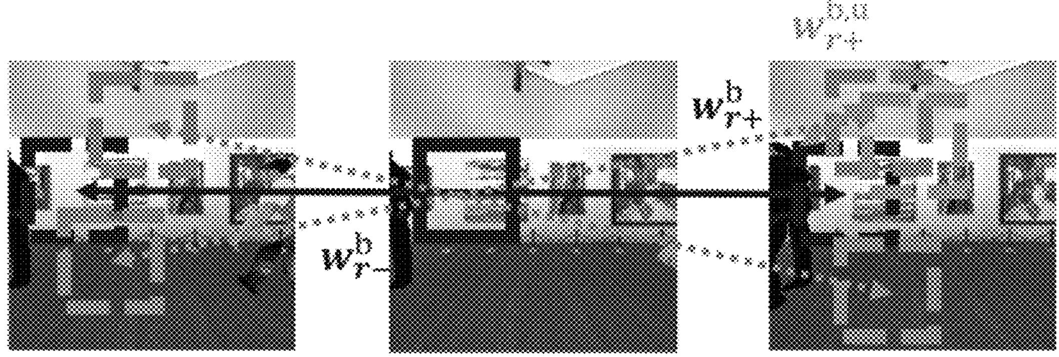
FIG. 7 is a view illustrating examples of a bilateral warping vector and a refinement warping vector.

In FIG. 7, the bilateral warping vectors $(w_{r+}^{b}, w_{r-}^{b})$ and the refinement warping vector $(w_{r+}^{b,u})$ are illustrated.

3) Thereafter, six (6) candidate intermediate reference features $(f_{r+}^{u}, f_{r-}^{u}, fw_{r-}^{b}, f_{r+}^{b,u}, f_{r-}^{b,u})$ are generated by applying the six (6) warping vectors $(w_{r+}^{u}, w_{r-}^{u}, w_{r+}^{b}, w_{r-}^{b}, w_{r+}^{b,u}, w_{r-}^{b,u})$ generated in x, y, t directions to the reference features $(f_{r+}, f_{r-})$.

4) An intermediate frame $(F_{I'})$ is generated by fusing the current feature $f_{tar}$ and the reference features $(f_{r+}, f_{r-})$ and the six (6) candidate intermediate reference features $(f_{r+}^{u}, f_{r-}^{u}, fw_{r-}^{b}, fr_{+}^{b,u}, f_{r-}^{b,u})$ One intermediate frame in each of the x, y, t directions, that is, three intermediate frames $(F_{It'}, F_{Ix'}, F_{Iy'})$ in total, are generated.

Figure 8:
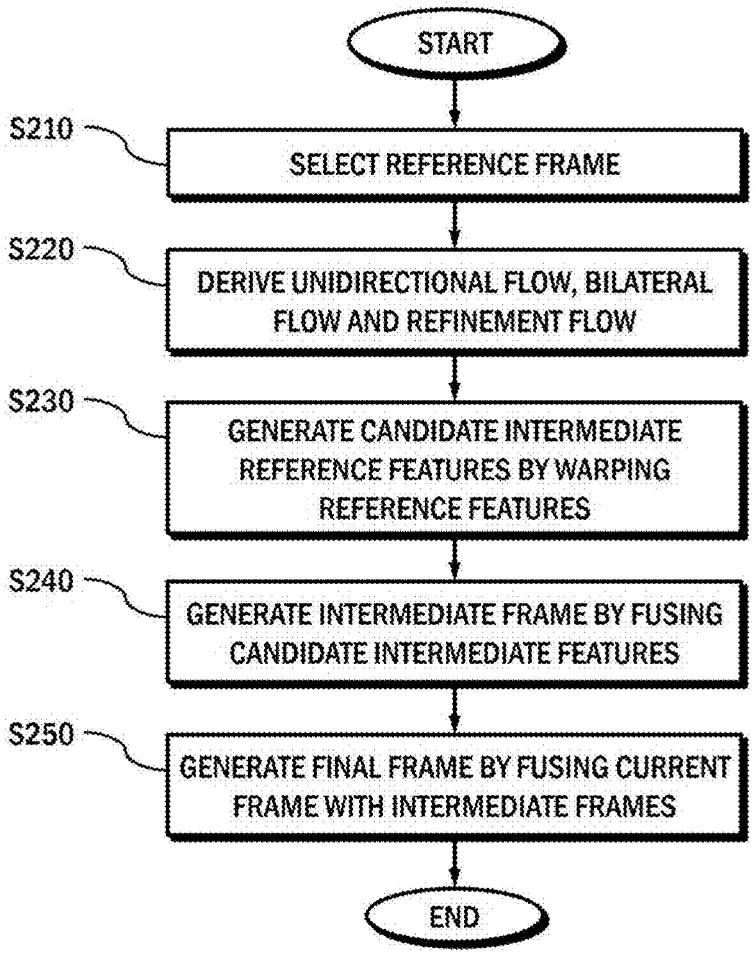
FIG. 8 is a flowchart of a multi-view video coding artifact reduction method according to an embodiment of the disclosure.

FIG. 8 is a flowchart illustrating a multi-view video coding artifact reduction method according to an embodiment of the disclosure.

To reduce a multi-view video coding artifact, frames positioned in neighbors of a current frame $(F_{tar})$ constituting the multi-view video are selected as reference frames (S210).

The reference frames include: 1) reference frames $(F_{t+}, F_{t+})$ positioned in temporal neighbors with reference to the current frame ($F_{tar}$); 2) reference frames ($F_{x+}$, $F_{x-}$) positioned in spatial neighbors in an x-axis direction; and 3) reference frames ($F_{y+}$, $F_{y-}$) positioned in spatial neighbors in a y-axis direction.

Unidirectional flows and bilateral flows between the current frame and the reference frames are derived, and a refinement flow is derived from the unidirectional flows and the bilateral flows (S220).

Step S220 is performed by processes of extracting reference feature vectors ($f_{r+}$, $f_{r-}$) from the reference frames ($F_{r+}$, $F_{r-}$), predicting unidirectional warping vectors ($w_{r+}^{u}$, $w_{r-}^{u}$) and bilateral warping vectors ($w_{r+}^{b}$, $w_{r-}^{b}$) from the extracted reference feature vectors ($f_{r+}$, $f_{r-}$) through unidirectional (forward and backward) motion estimation and bilateral motion estimation, and then, calculating refinement warping vectors ($w_{r+}^{b,u}$, $w_{r-}^{b,u}$) by using the predicted bilateral warping vectors ($w_{r+}^{b}$, $w_{r-}^{b}$) and unidirectional warping vectors ($w_{r+}^{u}$, $w_{r-}^{u}$).

Next, candidate intermediate reference features ($f_{r+}^{u}$, $f_{r-}^{u}$, $fw_{r-}^{b}$, $f_{r+}^{b,u}$, $f_{r-}^{b,u}$) are generated by warping the reference features ($f_{r+}$, $f_{r-}$) with the warping vectors ($w_{r+}^{u}$, $w_{r-}^{u}$, $w_{r+}^{b}$, $w_{r-}^{b}$, $w_{r+}^{b,u}$, $w_{r-}^{b,u}$) acquired by deriving flows at step S220 (S230).

An intermediate frame ($F_{I'}$) is generated by fusing the feature vector ($f_{tar}$) of the current frame and the reference feature vectors ($f_{r+}$, $f_{r-}$) with the candidate intermediate features generated at step S230 (S240). Lastly, a final frame ($F_{enh}$) with enhanced image quality for the current frame is generated by fusing the current frame (Far) with the three intermediate frames ($F_{It'}$, $F_{Ix'}$, $F_{Iy'}$) generated at step S240 (S250).

Figure 9:
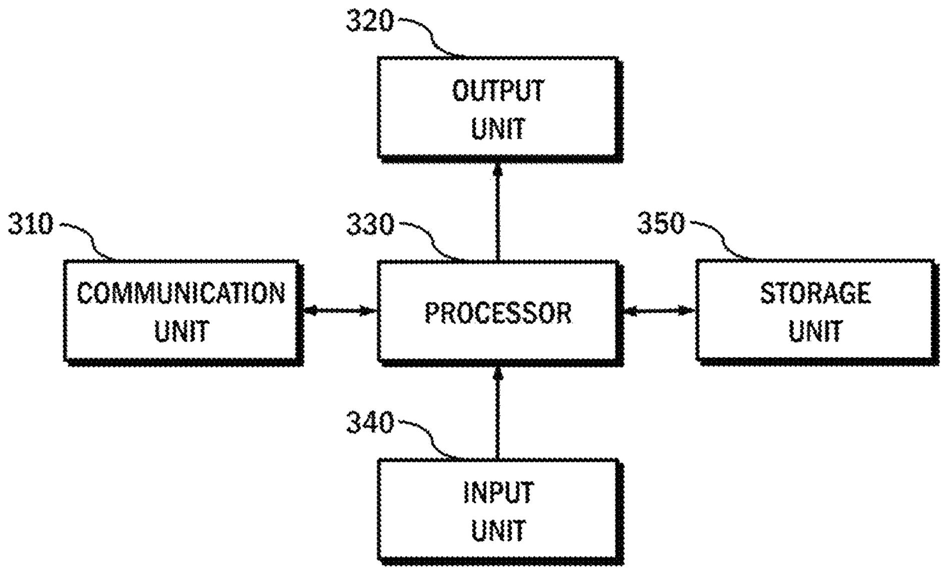
FIG. 9 is a view illustrating a multi-view video coding artifact reduction system according to another embodiment of the disclosure.

FIG. 9 is a view illustrating a configuration of a multi-view video coding artifact reduction system according to another embodiment of the disclosure. As shown in FIG. 9, the multi-view video coding artifact reduction system according to another embodiment may implemented by a computing system which includes a communication unit 310, an output unit 320, a processor 330, an input unit 340, and a storage unit 350.

The communication unit 310 is a communication interface for connecting to an external network or an external device, the output unit 320 is an output means for displaying a result of calculating by the processor 330, and the input unit 340 is a user interface for receiving a user command and delivering the same to the processor 330.

The processor 330 may enhance image quality by reducing a coding artifact in a multi-view video according to the procedure shown in FIGS. 5 and 8. The storage unit 350 provides a storage space necessary for functions and operations of the processor 330.

Up to now, a method and a system for reducing a coding artifact of a multi-view video have been described with reference to preferred embodiments.

In order to overcome a problem that an artifact occurring when a multi-view video is compressed degrades rendering quality of a 3D space when view reconstruction is performed, embodiments of the disclosure provide stable performance by additionally using a bilateral vector and a refinement vector, instead of using only an existing unidirectional vector, in acquiring texture information of high quality from a reference frame that has few coding artifacts among frames positioned in neighbors of a current video frame on a time and a viewpoint.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A multi-view video coding artifact reduction method comprising:

selecting reference fames in neighbors of a current frame constituting a multi-view video;

deriving unidirectional flows and bilateral flows between the current frame and the reference frames;

warping the reference frames based on the derived flows;

generating intermediate frames by fusing the current frame, the reference frames, and the warped reference frames; and generating a final frame by fusing the current frame and the intermediate frames, wherein the reference frames comprise:

first reference frames which are positioned in temporal neighbors with reference to the current frame;

second reference frames which are positioned in spatial neighbors in an x-axis direction with reference to the current frame; and third reference frames which are positioned in spatial neighbors in a y-axis direction with reference to the current frame, and wherein the generating the intermediate frames comprises:

generating first intermediate frames by fusing the current frame, the first reference frames, and warped first reference frames;

generating second intermediate frames by fusing the current frame, the second reference frames and warped second reference frames; and generating third intermediate frames by fusing the current frame, the third reference frames and warped third reference frames.

2. The multi-view video coding artifact reduction method of claim 1, wherein the deriving comprises:

extracting a current feature vector and reference feature vectors from the current frame and the reference frames;

predicting unidirectional warping vectors from the extracted reference feature vectors through unidirectional motion estimation; and predicting bilateral warping vectors from the extracted reference feature vectors through bilateral motion estimation.

3. The multi-view video coding artifact reduction method of claim 2, wherein the deriving comprises further deriving a refinement flow from the unidirectional flow and the bilateral flow.

4. The multi-view video coding artifact reduction method of claim 3, wherein the deriving further comprises a calculating refinement warping vectors by using the predicted bilateral warping vectors and unidirectional warping vectors.

5. The multi-view video coding artifact reduction method of claim 4, wherein the calculating comprises calculating unidirectional warping vectors of intermediate frames which are generated by the bilateral warping vectors as refinement warping vectors.

6. The multi-view video coding artifact reduction method of claim 5, wherein the generating the intermediate frames comprises:

generating candidate reference feature vectors by applying corresponding warping vectors to the reference feature vectors; and generating the intermediate frames by fusing the current feature vector with the reference feature vectors and the candidate reference feature vectors.

7. The multi-view video coding artifact reduction method of claim 1, wherein the generating the final frame comprises generating the final frame by fusing the current frame with the first intermediate frame, the second intermediate frame, and the third intermediate frame.

8. A multi-view video coding artifact reduction system comprising:

a processor configured to: select reference fames in neighbors of a current frame constituting a multi-view video; derive unidirectional flows and bilateral flows between the current frame and the reference frames; warp the reference frames based on the derived flows; generate intermediate frames by fusing the current frame, the reference frames, and the warped reference frames; and generate a final frame by fusing the current frame and the intermediate frames; and a storage unit configured to provide a storage space necessary for functions and operations of the processor, wherein the reference frames comprise:

first reference frames which are positioned in temporal neighbors with reference to the current frame;

second reference frames which are positioned in spatial neighbors in an x-axis direction with reference to the current frame; and third reference frames which are positioned in spatial neighbors in a y-axis direction with reference to the current frame, and wherein, for the generating the intermediate frames, the processor is configured to:

generate first intermediate frames by fusing the current frame, the first reference frames, and warped first reference frames;

generate second intermediate frames by fusing the current frame, the second reference frames and warped second reference frames; and generate third intermediate frames by fusing the current frame, the third reference frames and warped third reference frames.

9. The system of claim 8, wherein, for the deriving, the processor is configured to:

extract a current feature vector and reference feature vectors from the current frame and the reference frames;

predict unidirectional warping vectors from the extracted reference feature vectors through unidirectional motion estimation; and predict bilateral warping vectors from the extracted reference feature vectors through bilateral motion estimation.

10. The system of claim 9, wherein, for the deriving, the processor is further configured to derive a refinement flow from the unidirectional flow and the bilateral flow.

11. The system of claim 10, wherein, for the deriving, the processor is further configured to calculate refinement warping vectors by using the predicted bilateral warping vectors and unidirectional warping vectors.

12. The system of claim 11, wherein, for the calculating, the processor is configured to calculate unidirectional warping vectors of intermediate frames which are generated by the bilateral warping vectors as refinement warping vectors.

13. The system of claim 12, wherein, for the generating the intermediate frames, the processor is configured to:

generate candidate reference feature vectors by applying corresponding warping vectors to the reference feature vectors; and generate the intermediate frames by fusing the current feature vector with the reference feature vectors and the candidate reference feature vectors.

14. The system of claim 8, wherein, for the generating the final frame, the processor is configured to generate the final frame by fusing the current frame with the first intermediate frame, the second intermediate frame, and the third intermediate frame.

15. A multi-view video coding artifact reduction method including:

deriving unidirectional flows and bilateral flows between a current frame and reference frames which are positioned in neighbors of the current frame;

generating intermediate frames based on the derived flows; and generating a final frame by fusing the current frame and the intermediate frames, wherein the reference frames comprise:

first reference frames which are positioned in temporal neighbors with reference to the current frame;

second reference frames which are positioned in spatial neighbors in an x-axis direction with reference to the current frame; and third reference frames which are positioned in spatial neighbors in a y-axis direction with reference to the current frame, and wherein the generating the intermediate frames comprises:

generating first intermediate frames by fusing the current frame, the first reference frames, and warped first reference frames;

generating second intermediate frames by fusing the current frame, the second reference frames and warped second reference frames; and generating third intermediate frames by fusing the current frame, the third reference frames and warped third reference frames.

16. The multi-view video coding artifact reduction method of claim 15, wherein the deriving comprises:

extracting a current feature vector and reference feature vectors from the current frame and the reference frames;

predicting unidirectional warping vectors from the extracted reference feature vectors through unidirectional motion estimation; and predicting bilateral warping vectors from the extracted reference feature vectors through bilateral motion estimation.

17. The multi-view video coding artifact reduction method of claim 16, wherein the deriving comprises further deriving a refinement flow from the unidirectional flow and the bilateral flow.

18. The multi-view video coding artifact reduction method of claim 17, wherein the deriving further comprises calculating refinement warping vectors by using the predicted bilateral warping vectors and unidirectional warping vectors.

19. The multi-view video coding artifact reduction method of claim 18, wherein the calculating comprises calculating unidirectional warping vectors of intermediate frames which are generated by the bilateral warping vectors as refinement warping vectors.

20. The multi-view video coding artifact reduction method of claim 19, wherein the generating the intermediate frames comprises:

generating candidate reference feature vectors by applying corresponding warping vectors to the reference feature vectors; and generating the intermediate frames by fusing the current feature vector with the reference feature vectors and the candidate reference feature vectors.

* * * * *